United States Patent [19]

Mott

[11] Patent Number: 4,516,963
[45] Date of Patent: May 14, 1985

[54] POWER TRANSMISSION CHAIN-BELT
[75] Inventor: Philip J. Mott, Des Plaines, Ill.
[73] Assignee: Borg-Warner Corporation, Chicago, Ill.
[21] Appl. No.: 497,478
[22] Filed: May 23, 1983
[51] Int. Cl.³ ............................................... F16G 5/18
[52] U.S. Cl. ..................................... 474/245; 474/201
[58] Field of Search ............... 474/245, 242, 240, 244, 474/248, 270, 201, 229

[56] References Cited

U.S. PATENT DOCUMENTS

| 4,313,730 | 2/1982 | Cole et al. | 474/201 |
| 4,344,761 | 8/1982 | Steuer | 474/245 |
| 4,386,922 | 6/1983 | Ivey | 474/242 |

Primary Examiner—James A. Leppink
Assistant Examiner—Thuy M. Bui
Attorney, Agent, or Firm—Aubrey L. Burgess

[57] ABSTRACT

A power transmission chain-belt, especially adapted to provide a drive and transmit power between the pulleys of a pulley transmission, such as a variable ratio pulley transmission. The chain-belt is constructed of a plurality of ranks or sets of interleaved links, each rank being joined to the next adjacent rank by pivot means, such as round pins, or a pin and rocker, to permit articulation of the belt. Generally trapezoidal load blocks are located between the pivot means of each rank or set of links, which blocks have opposite edge surfaces to contact the flanges of the pulleys. At least one load block has a differently dimensioned or arranged contact area than the other load blocks. This changes the generated noise pattern produced when the chain-belt engages the pulley flanges.

14 Claims, 7 Drawing Figures

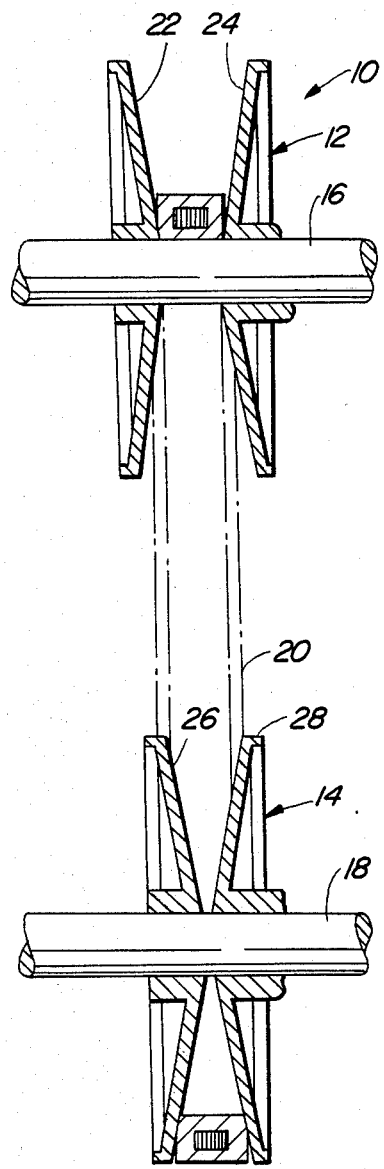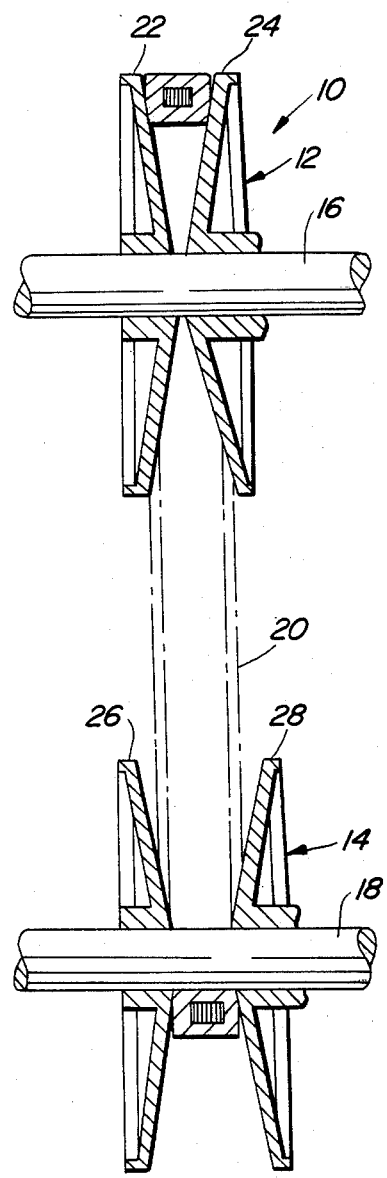

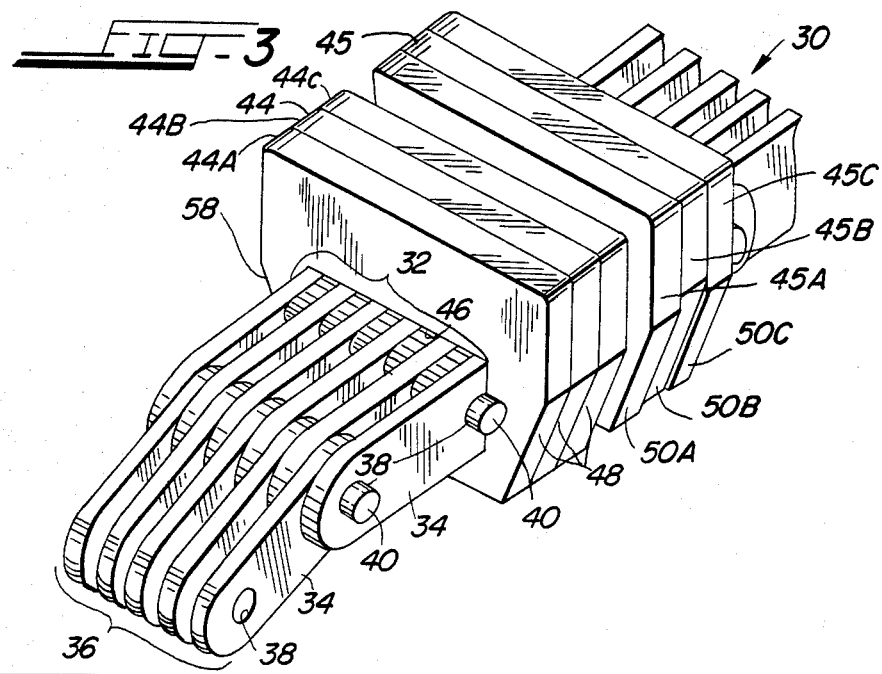
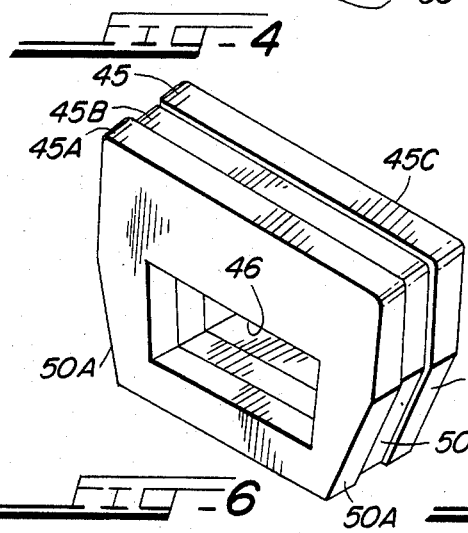
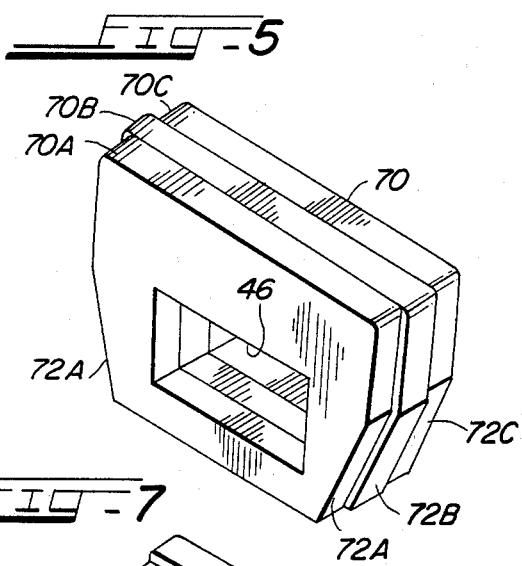
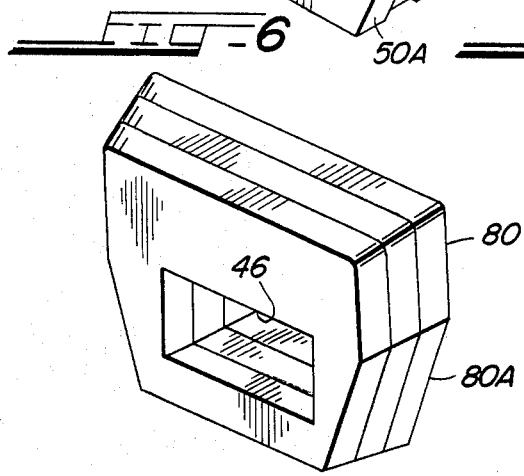
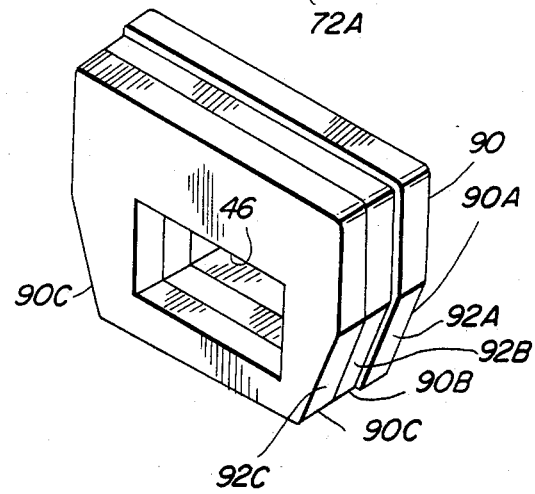

POWER TRANSMISSION CHAIN-BELT

BACKGROUND OF THE INVENTION

Variable pulley transmissions for transferring torque from an input shaft to an output shaft have been used for some time. In such arrangements a first pulley is mounted on the input shaft, and this pulley has at least one flange axially movable relative to its other flange to change the effective pulley diameter. A second, similarly adjustable pulley is mounted on the output shaft. A flexible belt intercouples the two pulleys to transfer torque between them. As the effective diameter of one pulley is changed, and simultaneously the effective diameter of the other pulley is changed in the opposite direction, the drive ratio between the input and output shafts is adjusted in a smooth, continuous manner.

For over 30 years automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continuously variable transmission of the type described above. This has resulted in the production and marketing in Europe of the Daf passenger car, using a flexible rubber belt in such a continuously variable transmission (CVT). Such a belt must be relatively wide because of the torque it must handle, and operates under severe temperature, vibration and other adverse conditions. Accordingly, efforts have been channeled to produce a flexible belt of metal, and some of these efforts are described in the patent literature. Such belts can be relatively narrow and possess more load-t torque handling capacity than a rubber belt of the same cross-section and, in addition, provide greater efficiency in transmitting torque between the pulleys of the transmission.

A chain belt for a pulley transmission comprising ranks or sets of links interleaved with other sets of links and connected by pivot means, and drive or load blocks of generally trapezoidal shape located between adjacent pivot pins to transmit load to the pins is disclosed and claimed in U.S. Pat. No. 4,313,730, issued Feb. 2, 1982 to Cole et al. In this patent, the drive or load blocks have a centrally located "window" through which links of the chain pass, and angled side edges which drivingly engage the pulley flanges. This belt is of the "pull" or tension type because the drive or load blocks do not move longitudinally along the chain but are constrained by the pivot means.

Another type of metal drive belt for a pulley transmission is taught in U.S. Pat. No. 3,720,113 and comprises a flexible band of superimposed, nested steel strips with metal blocks longitudinally movable thereon. Each of the blocks has tapered edges to engage the flanges of the pulleys of the transmission. The metal blocks move longitudinally along the band, and this belt is classified as a "push" or compression type. The projected cost of the described "push" type belt is several times the cost of a "pull" chain-belt as taught by Cole et al. Thus, economically, the Cole et al chain-belt is much more attractive than the belt of U.S. Pat. No. 3,720,113.

One factor to be considered in using the CVT for automotive torque transfer is the noise generated by the engagement of drive blocks and pulley flanges. Noise which "peaks" (that is, rises to a high amplitude over a relatively narrow bandwidth) at certain frequencies in a regular pattern can be disagreeable and annoying to humans. Acoustic research results have proven that a white, irregular or arrhythmic noise is less noticeable and annoying than a noise which contains recognizable pure tones or a single frequency. The most annoying chain noise is the single tone or frequency signal which may occur above 100 Hz, which signal rises above the average noise level by 5 to 10 dB. Some of the prior art chain-belts described may produce a noise which is annoying to humans.

SUMMARY OF THE INVENTION

One of the primary features of the invention to be described is the construction of a chain-belt for drivingly interconnecting the pulleys of a pulley transmission and, in operation, to produce a noise level which is acceptable for use in automobiles. An endless chain-belt is constructed of a plurality of ranks or sets of links interleaved with adjacent sets of links, a rank or set of links being a transverse group of links between and encompassing two adjacent pivot means. Each link has a pair of openings, one adjacent each end of the link. The openings at one end of a set of links are aligned with the openings at an end of the next adjacent set of links. Pivot means pass through the aligned openings to join the sets of links and to permit articulation of the assembly. The pivot means can comprise round pins, or sets of pins and rockers, both types of pivot means being well known in the art. Generally trapezoidal drive or load blocks are located on the ranks of links between adjacent pivot means. When necessary, the drive blocks have tapered front and back surfaces to permit the assembly to wrap or bend around the pulleys. This is not usually necessary because the pivot means space the drive blocks along the length of the chain. In any event, the drive or load blocks each have a centrally located window through which links pass and angled side edges to drivingly engage the pulley flanges. Each load or drive block can be a single member or a laminate, made up of several relatively thin parts. In the latter, the parts can be stamped from sheet metal and require little, if any, finishing. A single member can be machined from metal stock or produced by powder metal techniques.

In accordance with the present invention, the pulley engagement thickness of at least one drive block is intentionally modified to be different from others of the load blocks. Such modified load blocks can be assembled in a uniform pattern, or in a random mixture of load blocks. The invention can be practiced by manufacturing and assembling modified types of drive blocks, as will be explained, or by assembling a drive chain-belt with uniform thickness drive blocks and grinding off at least one of the drive block pulley-engaging surfaces to change its effective pulley engagement thickness.

The operational noise pattern generated by a chain-belt modified in the manner disclosed above makes the chain-belt acceptable (from an acoustic standpoint) for use in the automotive industry.

BRIEF DESCRIPTION OF THE DRAWINGS

FIGS. 1 and 2 are schematic illustrations of a variable pulley transmission in different drive ratios;

FIG. 3 is an isometric illustration of a portion of one form of chain-belt constructed according to this invention;

FIG. 4 is an isometric view of one type of load block usable in the chain-belt of FIG. 3; and FIGS. 5 to 7 are isometric views of other types of load blocks usable in a chain-belt similar to that of FIG. 3.

DETAILED DESCRIPTION OF THE PREFERRED EMBODIMENT

FIGS. 1 and 2 illustrate schematically a variable pulley transmission 10 comprising a pair of spaced pulleys 12 and 14 mounted on generally parallel shafts 16 and 18. Pulleys 12 and 14 are interconnected by endless transmission belt 20. Belt 20 is not shown in detail but merely to depict the interconnection of pulleys 12 and 14. Pulley 12 comprises pulley flanges 22 and 24 and pulley 14 comprises pulley flanges 26 and 28. At least one flange of each pulley is axially movable with respect to the other to vary the drive ratio therebetween. FIGS. 1 and 2 illustrate the extremes of drive ratios between the pulleys. One or the other of the shafts can be designated as the drive shaft and connected to a source of power (not shown); the other shaft is designated as the driven shaft and is connected to the load which is to be driven, as for example, the wheels of an automobile (not shown).

Drive-chain or chain-belt 30 of this invention, a portion of one form being illustrated in FIG. 3, is connected in an endless loop of a length suitable to drivingly interconnect pulleys 12 and 14 of a variable pulley transmission, as schematically illustrated in FIGS. 1 and 2, it being understood that chain-belt 30 can be used to drivingly interconnect pulleys in any pulley transmission system if so desired.

Drive chain-belt 30 comprises a plurality of ranks or sets 32 of links 34 interleaved with adjacent sets 36 also made up of links 34. Sets 32 contain one more link than sets 36 because they include the outermost links of the chain. Each link has a pair of spaced apertures 38 adjacent its ends with the apertures at one end of the links being aligned with the apertures at one end of the links of the interleaved set of links. Pivot means 40, shown as round pins, are received in the aligned apertures to connect the sets of links together and to permit articulation of chain-belt 30. Other types of pivot means, such as pins and rockers, known in the art, can be used to connect the sets of links.

In order to drivingly engage flanges, such as 22, 24 and 26, 28 of pulleys 12 and 14, respectively (see FIGS. 1 and 2), a mixture of load block assemblies 44 and 45 is used. Each assembly surrounds a set of links, being positioned between adjacent pivot means 40. Each load block assembly 44 and 45 is constructed of a plurality of plates. Assembly 44 includes plates 44A, 44B, and 44C, and assembly 45 comprises plates 45A, 45B, 45C. Each plate has a generally rectangular central opening or window 46 permitting it to be assembled over the links of a set. Angled edges 48 of the plates in block 44, and edges 50A, 50B and 50C of block 45 give each block a trapezoidal appearance when viewed from the front or rear. At times, load blocks or block assemblies, such as those described, are referred to as being generally "V-shaped". While each load block is preferably a laminate of three metal plates, as illustrated, the block assembly can be comprised of fewer or more plates, or can be a solid block.

According to this invention, one or more load blocks such as block 45 is used in the drive chain-belt. The side edge configuration of load block 45 (particularly the portion where the edge of plate 45B abuts the pulley in operation) is different from that of load block 44. The load block 44 is constructed with all plates alike, while the load block 45 is constructed with the center plate 45B of a lesser width than the plates 45A and 45C. The plates 44A, 44B and 44C of load blocks 44 have angled edges 48, all of which drivingly contact the pulley flanges in normal operation, while the angled edges 50A and 50C of load block assembly 45 drivingly contact the pulley flanges and angled edges 50B do not drivingly contact the pulley flanges. Thus the area of contact of the mixture of load blocks in the chain-belt assembly and the pulley flanges varies. The load block 45 can be manufactured by producing two different width plates, or the center plate of a standard block, such as block 44, can be modified in width before or after assembly of the parts. The block plates can be uniform in thickness or vary in thickness. FIG. 4 illustrates a load block 45, constructed of a plurality of plates 45A, 45B and 45C, with the outermost plates wider than the central plate. By mixing at least these two types of load blocks in a chain-belt, the noise produced by the impact of the belt with the pulleys is modified and becomes less objectionable.

Another type of load block which can be used in a chain-belt according to this invention is illustrated in FIG. 5 and identified as 70. Load block assembly 70 is constructed of a pack of three plates 70A, 70B and 70C with the central plate 70B having edge surfaces 72B adapted to drivingly contact the flanges of the pulleys in a pulley transmission. The plates 70A and 70C have edge surfaces 72A and 72C which do not drivingly contact the pulleys. In other words, the plates 70A and 70C are not as wide as the plate 70B. At least one modified block, as illustrated in FIG. 5, is assembled in a chain; preferably several are assembled in a random mixture with other blocks, such as block 44 of FIG. 3, in a chain. The effect is generally the same as described with respect to load block 45. Block 70 can be turned 180° and assembled with other blocks 70 and 44 in a chain-belt within the scope of this invention.

FIGS. 6 and 7 illustrate other types of load blocks which can be used in the same manner as the FIGS. 4 and 5 load blocks. Load block 80 of FIG. 6 is tapered from edge-to-edge to present a radial line contact, such as 80A, with the pulley flanges. Such a block can be turned 180° and alternated with blocks as shown in FIG. 6 to thus modify the impact pattern of the blocks and the pulley flanges. Block 90 of FIG. 7 is a modification of blocks 45 and 70, in that one plate 90A has edge surfaces 92A which contact the pulley flanges, while edge surfaces 92B and 92C of plates 90B and 90C do not contact the pulley flanges.

While the illustrations show block assemblies of three plates, it is to be understood that two plates, or more than three plates, can be used in one block assembly. Also solid, one piece blocks can be used, so long as they are modified in accordance with this invention.

In accordance with the teachings of this invention, at least two different types of load blocks are manufactured and assembled with a chain, either in a predetermined pattern or in a random mixture. Chain-belts according to this invention can also be manufactured by assembling a chain-belt with all load blocks of usual configuration and, thereafter, grinding the pulley contacting surfaces of at least one load block in the assembly to change its width, so that a part does not drivingly contact the pulley surface. A mixture of all types of blocks illustrated can be used, if desired.

The load blocks, the links, and the pivot means are made of metal, for example, various types of steel. The pivot means are usually manufactured of a higher carbon steel than the load blocks, which in turn are of a higher carbon steel than the chain links. The pivot means are generally heat treated to increase their strength. The chain links and the load blocks are usually stamped from sheet metal using known stamping techniques. The pivot means can be cut from a drawn metal shape.

It is known in the art that the pitch line (a line drawn through the centers of the successive pivot means) of a rigid link chain on a drive sprocket is polygonal rather than circular and its engagement action is inherently one of impact with the teeth of the drive sprockets. The path of the chain in relation to the sprocket gives rise to what is termed "chordal action", i.e. the pitch line traverses a radial path as well as a longitudinal path as it enters the sprockets. This "chordal action" is also present when a chain-belt is used in a pulley transmission, and the impact gives rise to the undesirable noise peaks caused by the impact engagement action. The modifications in width of parts of drive blocks carried by the chain and the location of the contact area of a load block with the pulley flanges, taught by this invention, changes the timing pattern and area of the impact of the load blocks with the pulley flanges and modifies the ultimate noise pattern, so that it is less offensive to the human ear and acceptable for use in passenger automobiles.

When used herein and in the appended claims, the expression "load blocks" means an assembly of block plates or a solid one-piece member, each load block being located between the next adjacent pivot means which interconnect sets of links.

The appended claims are intended to cover all reasonable equivalents of the invention.

I claim:

1. A chain-belt for drivingly connecting the pulleys of a pulley transmission, each pulley having a pair of flanges, comprising a plurality of sets of links interleaved with other sets of links, each link having a pair of spaced apertures, the apertures in one set of links being transversely aligned with the apertures of the next adjacent set of links which is interleaved therewith to form groups of aligned apertures, pivot means positioned in each group of aligned apertures to join said sets of links and to permit articulation of the chain-belt, and a generally trapezoidal-shaped load block transversely surrounding each set of links and positioned between the adjacent pivot means, each load block having angled side edges defining an engaging area for drivingly contacting the flanges of said pulleys, at least one load block having a pulley engaging area different than the pulley engaging areas of other load blocks.

2. A chain-belt as recited in claim 1, in which said one load block has edge surfaces angled from one face to the other face.

3. A chain-belt as recited in claim 1, and further comprising a plurality of additional load blocks identical to said one load block, all of said load blocks being randomly located among the other load blocks along the length of said chain-belt.

4. A method for producing an improved chain-belt to drivingly engage the flanges of pulleys for use in a pulley transmission and of a plurality of sets of links interleaved with adjacent sets of links, each link having an aperture adjacent each end and the sets of links having transversely aligned apertures with the interleaved sets of links having their apertures transversely aligned to form groups of apertures, pivot means passing through each group of aligned apertures, and a load block surrounding each set of links positioned between adjacent pivot means, each load block having angled edge surfaces of substantially the same area adapted to engage the pulley flanges, comprising the steps of:
   a. arranging links as sets;
   b. interleaving adjacent sets of links;
   c. joining adjacent sets of links by passing a pivot means through a group of apertures;
   d. assembling a load block over each set of links;
   e. continuing steps a, b, c, and d until an endless chain-belt is produced; and
   f. grinding the angled edges of at least a portion of one load block, so that its pulley flange engaging area is different from the remainder of the load blocks.

5. A method for producing an improved chain-belt to drivingly engage the flanges of pulleys for use in a pulley transmission and of a plurality of sets of links interleaved with adjacent sets of links, each link having an aperture adjacent each end, and the sets of links having transversely aligned apertures with the interleaved sets of links having their apertures transversely aligned to form groups of apertures, pivot means passing through each group of aligned apertures, and a load block surrounding each set of links positioned between adjacent pivot means, each load block having angled edge surfaces each defining an engaging area adapted to engage the pulley flanges, comprising the steps of:
   a. forming a plurality of load blocks to provide a supply of load blocks having at least two different pulley engaging areas;
   b. arranging links as sets;
   c. interleaving adjacent sets of links;
   d. joining adjacent sets of links by passing a pivot means through a group of apertures; and
   e. assembling a load block from the supply of load blocks over each set of links;
   f. continuing steps b, c, d and e until an endless chain-belt is produced.

6. A chain-belt for drivingly connecting the pulley of a pulley transmission, each pulley having a pair of flanges, comprising a plurality of sets of links interleaved with other sets of links, each link having a pair of spaced apertures, the apertures in one set of links being transversely aligned with the apertures in the next adjacent set of links which is interleaved therewith to form groups of aligned apertures, pivot means positioned in each group of aligned apertures to join said sets of links and to permit articulation of the chain-belt, and a generally trapezoidal-shaped load block assembly transversely surrounding each set of links and positioned between the adjacent pivot means, each load block having angled edge portions, each load block assembly comprising a plurality of relatively thin plates, at least one plate of at least one load block assembly having its angled edge portions so constructed and arranged as to drivingly contact said pulley flanges, at least one other plate in said one load block assembly have its angled edge portions so constructed and arranged as to be free of driving contact with said pulley flanges.

7. A chain-belt as recited in claim 6, wherein all load blocks assemblies are modified.

8. A chain-belt as recited in claim 6, in which there are a plurality of modified load block assemblies.

9. A chain-belt as recited in claim 8, in which said modified load block assemblies are arranged in a predetermined pattern.

10. A chain-belt as recited in claim 8, in which said modified load block assemblies are arranged in a random pattern.

11. A chain-belt as recited in claim 6, in which each load block assembly is constructed of three plates, and the center plate is modified to be free of driving contact with the pulley flanges.

12. A chain-belt as recited in claim 6, in which each load block assembly is constructed of three plates, and the center plate is constructed and arranged to drivingly contact the pulley flanges.

13. A chain-belt as recited in claim 6, in which each load block assembly is constructed of three plates, and one plate in some block assemblies is constructed and arranged to drivingly contact the pulley flanges.

14. A chain-belt assembly as recited in claim 6, in which each load block assembly is constructed of three plates, and two plates in some block assemblies are constructed and arranged to drivingly contact the pulley flanges.

* * * * *